United States Patent [19]
Iida et al.

[11] 4,449,733
[45] May 22, 1984

[54] ELEVATIONALLY ADJUSTABLE FLUID SUSPENSION SYSTEM FOR A WHEEL TRACTOR SCRAPER OR THE LIKE

[75] Inventors: Akio Iida, Kawasaki; Osamu Kurihara, Yokohama, both of Japan

[73] Assignee: Kabushiki Kaisha Komatsu Seisakusho, Tokyo, Japan

[21] Appl. No.: 333,473

[22] Filed: Dec. 22, 1981

[30] Foreign Application Priority Data

Dec. 27, 1980 [JP] Japan ................. 55-185051

[51] Int. Cl.$^3$ ........................................... B60G 11/26
[52] U.S. Cl. ............................. 280/707; 37/126 A; 37/DIG. 1
[58] Field of Search ............... 280/6 R, 6 H, 6.1, 693, 280/698, 702, 707, 708, 714; 37/126 R, 126 A, 129, DIG. 1

[56] References Cited

U.S. PATENT DOCUMENTS

| | | | |
|---|---|---|---|
| 3,118,686 | 1/1964 | McAdams | 280/702 |
| 3,299,547 | 1/1967 | Gee | 37/129 |
| 3,524,634 | 8/1970 | Schmidt | 280/6 R |
| 3,549,168 | 12/1970 | Swanson | 280/702 |
| 3,992,039 | 11/1976 | Hiruma | 280/708 |
| 4,050,704 | 3/1977 | Duca | 280/6 R |
| 4,105,216 | 8/1978 | Graham | 280/6 R |
| 4,279,319 | 7/1981 | Joyce | 280/702 |

Primary Examiner—Douglas C. Butler
Assistant Examiner—John A. Carroll
Attorney, Agent, or Firm—Armstrong, Nikaido, Marmelstein & Kubovcik

[57] ABSTRACT

In a tractor-scraper combination having a single-axle two-wheel tractor and an earthmoving scraper articulately joined together, one or two hydraulic suspension jacks are operatively connected between the axle and main frame of the tractor for varying the distance therebetween in accordance with the loaded or empty state of the scraper. Connected between each suspension jack and a pump, a leveling valve normally communicates the pump with some other hydraulic system of the vehicle and, on actuation, selectively communicates the suspension jack with the pump and with a fluid drain. When the bowl of the scraper becomes loaded or unloaded, a pressure sensor connected to a bowl jack actuates a timer, causing same to allow energization of an elevation sensor connected between the axle and main frame of the tractor. The energized elevation sensor puts out a signal representative of the elevation of the tractor main frame above the axle. A solenoid valve responds to the elevation sensor signal by causing a double-acting air cylinder to actuate the leveling valve, with the consequent leveling of the vehicle by the suspension jack. An accumulator in communication with the suspension jack absorbs the normal dynamic motion of the vehicle during travel.

7 Claims, 2 Drawing Figures

ELEVATIONALLY ADJUSTABLE FLUID SUSPENSION SYSTEM FOR A WHEEL TRACTOR SCRAPER OR THE LIKE

BACKGROUND OF THE INVENTION

This invention relates to a fluid suspension system for vehicles in general and, in particular, for a single-axle wheel-type tractor articulately joined with an earthmoving scraper to provide a self-propelled tractor-scraper combination.

Single-axle wheel-type tractors in tractor-scraper combinations, for example, usually employ hydraulic jacks for an elevationally adjustable suspension between vehicle frame and axle. Suspension control valves act to allow delivery of pressurized fluid into the suspension jacks when the scraper is loaded, and to cause withdrawal of the fluid from the jacks when the scraper is unloaded, thereby leveling the vehicle in both the loaded and unloaded conditions.

An objection to the prior art fluid suspension system of this type arises from the fact that the suspension control valves are mechanically linked to the tractor axle. Inevitably, therefore, the valves operate with the up-and-down motion of the vehicle during travel, resulting in the waste of the hydraulic fluid under pressure. Such unnecessary repetitive energizing of the valves materially shortens the useful life of the components making up the suspension system.

Another serious drawback of the known fluid suspension system is that it requires a pump devoted exclusively to suspension control. The tractor-scraper of the type in question demands leveling by the suspension system only when the vehicle height changes upon loading and unloading of the scraper. The function of the suspension system as a vibration absorber to take up the normal dynamic motion of the machine traveling over rough terrain can be performed by some means other than the hydraulic jacks.

SUMMARY OF THE INVENTION

The present invention seeks generally to eliminate the waste of energy in a fluid suspension system of the type under consideration and to make longer the life of the components of the system. More specifically, in a wheel tractor-scraper combination, the invention seeks to provide an improved fluid suspension system which automatically performs leveling operation only when the scraper is loaded or unloaded, and hence to make it possible for the pressurized fluid source of the system normally to power some other fluid system of the machine.

Stated broadly, the invention provides an elevationally adjustable fluid suspension system for a vehicle of the type having an axle connected to a vehicle frame for movement toward and away from same. The suspension system comprises at least one fluid suspension jack to be operatively connected between the axle and the vehicle frame for adjustably varying the distance therebetween. A directional control valve when actuated communicates the fluid suspension jack either with a pressurized fluid source or with a fluid drain and normally holds the source in communication with some other fluid system of the vehicle. Connected between the axle and the vehicle frame, an elevation sensor puts out a signal representative of the elevation of the vehicle frame from the axle in response to actuation by an externally controllable timer. Valve actuating means respond to this output signal of the elevation sensor by correspondingly actuating the directional control valve.

In a preferred embodiment, in which the suspension system is adapted for the combination of a single-axle wheel-type tractor and a scraper, the timer is under control of a pressure sensor connected to a bowl jack of the scraper for sensing whether the bowl is loaded or unloaded. The pressure sensor causes the timer to energize the elevation sensor only when the bowl becomes loaded or unloaded. The energized elevation sensor senses the elevation of the tractor frame at that moment and correspondingly causes the valve actuating means to actuate the directional control, or leveling, valve, for leveling the tractor with respect to the scraper via the suspension jack. It is thus seen that the fluid suspension system of this invention automatically levels the wheel tractor in relation to the scraper only when the latter becomes loaded or unloaded. Normally the leveling valve directs the pressurized fluid from the source, which has heretofore been used solely for the fluid suspension system, to some other fluid systems of the vehicle. The preferred embodiment employs an accumulator, in constant communication with the suspension jack, for absorbing the normal dynamic motion of the vehicle during travel.

According to an additional feature of the invention a manual switch is also connected to the timer for causing same to energize the elevation sensor as required. The manual switch is further connected to the valve actuating means for manually placing the suspension jack with the drain via the leveling valve.

The above and other features and advantages of this invention and the manner of attaining them will become more apparent, and the invention itself will best be understood, from a study of the following description of the preferred embodiment illustrated in the attached drawings.

DESCRIPTION OF THE PREFERRED EMBODIMENT

Figure 1:
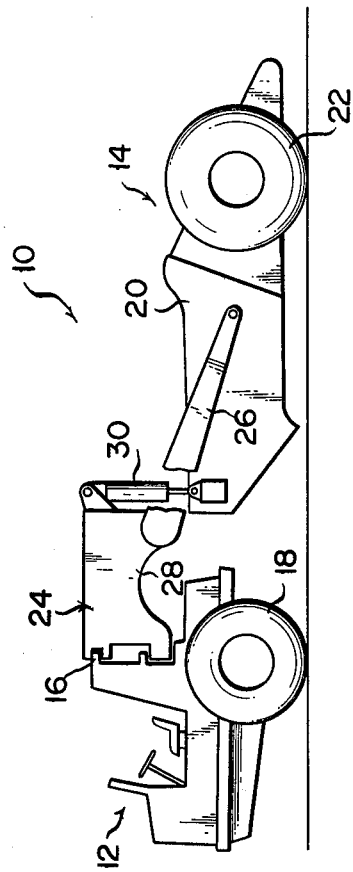
FIG. 1 is an elevation of a wheel tractor-scraper combination to which the principles of the present invention are applicable.

It will redound to a better understanding of the invention to briefly describe, first of all, a typical vehicle suitable for use with the fluid suspension system of this invention. Generally referenced 10 in FIG. 1, the representative vehicle is shown as the combination of a single-axle wheel-type tractor 12 and an earthmoving scraper 14 articulately joined together at 16. The tractor 12 is mounted on a pair of rubber-tired wheels 18 via the fluid suspension system in accordance with the invention, as later detailed in connection with FIG. 2. The earthmoving scraper 14 includes a bowl 20 in the form of a box-like forwardly opening receptacle for carrying dirt or other material. The bowl is mounted on a pair of rubber-tired wheels 22.

A draft frame 24 includes a pair of laterally spaced draft arms 26 pivotally connected to opposite sides of the bowl 20. Also included is a gooseneck 28 extending forwardly from the scraper and articulately coupled to the tractor 12 at 16. A bowl jack or a pair of bowl jacks 30 are pivotally mounted on the draft frame for elevationally adjustable support of the front end of the bowl 20.

Figure 2:
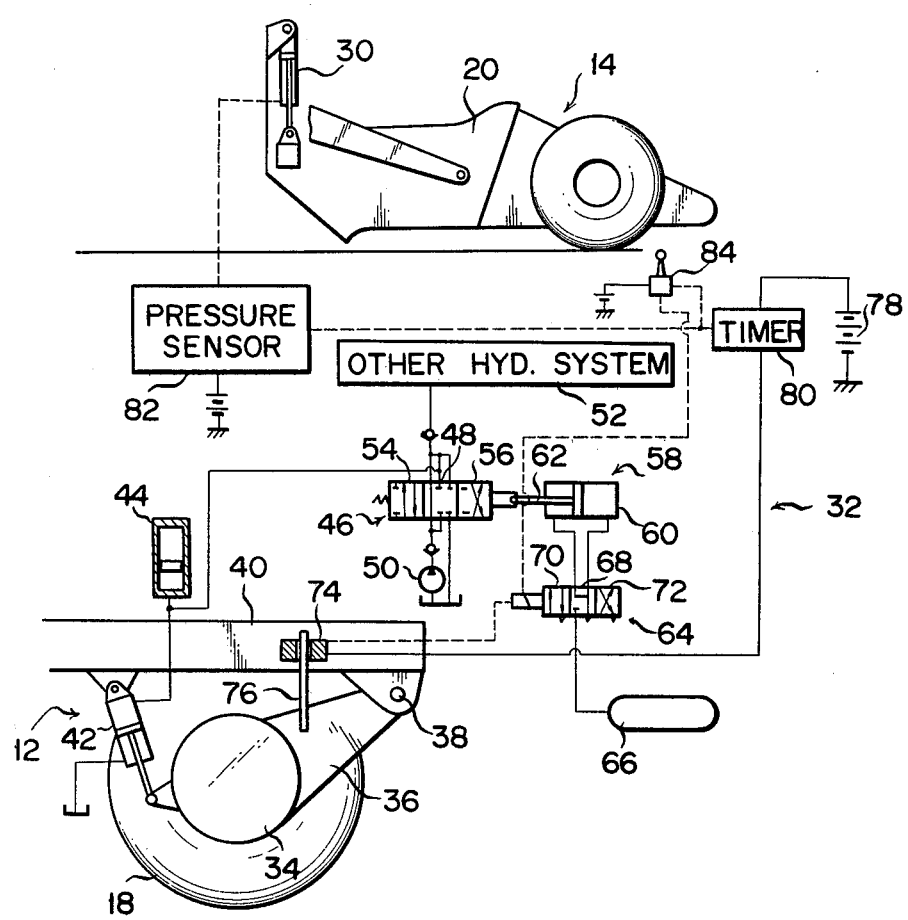
FIG. 2 is a schematic diagram of a preferred form of the fluid suspension system in accordance with the invention as adapted for the tractor-scraper combination of FIG. 1.

As illustrated in detail in FIG. 2, the tractor 12 is mounted on the pair of wheels 18 via an independent fluid suspension system, generally designated 32, in accordance with the invention. FIG. 2 shows only one of the tractor wheels 18 and the suspension system associated therewith. Only the illustrated suspension system will therefore be described in detail, it being understood that the other system is of essentially identical configuration.

The tractor wheel 18 is mounted as usual on an axle 34, which is rotatably carried on the free end of an arm 36 pivotally coupled at 38 to a main frame 40 of the tractor. The axle 34 is therefore movable toward and away from the main frame 40. A hydraulic suspension jack 42 is pivotally coupled at both ends to the axle 34 and to the main frame 40 for varying the distance therebetween. The suspension jack 42 is in constant communication with a pneumatic accumulator 44 which functions as a vibration absorber to take up the dynamic motion of the vehicle as when same is traveling over rough terrain.

Also in communication with the suspension jack 42 is a leveling valve 46 in the form of a power-actuated, six-port, three-position directional control valve. The three positions of the leveling valve 46 are:

1. A neutral position 48 for discommunicating the suspension jack 42 from both a pump 50 and a fluid drain and communicating the pump with some other hydraulic system, depicted as a block 52, of the vehicle.

2. A first offset position 54 for placing the pump 50 in communication with the suspension jack 42 and out of communication with the hydraulic system 52.

3. A second offset position 56 for placing the suspension jack 42 in communication with the fluid drain and holding the pump 50 in communication with the hydraulic system 52.

Thus the leveling valve 46 directs the pressurized fluid from the pump 50 toward the suspension jack 42 only when shifted to the first offset position 54. In the other valve positions 48 and 56 the pump 50 powers some other hydraulic system 52 of the vehicle.

The reference numeral 58 generally indicates a mechanism for actuating the leveling valve 46. The valve actuating mechanism 58 comprises a double-acting air cylinder 60 having its piston rod 62 coupled directly to the leveling valve 46, and a solenoid-actuated, four-port, three-position directional control valve 64 for controlling communication between the air cyliner 60 and a source 66 of compressed air. The three positions of the solenoid valve 64 are:

1. A neutral position 68 for venting both chambers of the air cylinder 60, thereby maintaining the leveling valve 46 in the neutral position 48.

2. A first offset position 70 for placing the compressed air source 66 with the rod end chamber of the air cylinder 60, thereby shifting the leveling valve 46 to the first offset position 54.

3. A second offset position 72 for placing the source 66 with the head end chamber of the air cylinder 60, thereby shifting the leveling valve 46 to the second offset position 56.

For actuating the solenoid valve 64 of the valve actuating mechanism 58 an elevation sensor 74 is mounted to the main frame 40 of the tractor. The elevation sensor 74 has a sensing rod 76 coupled to the arm 36, or essentially to the axle 34, for putting out a signal corresponding to the elevation of the tractor frame from the axle. This output signal is delivered to the solenoid of the valve 64. The elevation sensor 74 is electrically connected to a power supply 78 via a timer 80, so that the sensor produces the noted output signal only when energized from the power supply upon activation of the timer.

The timer 80 is activated both by a pressure sensor 82 and by a manual switch 84. Connected to the bowl jack 30 of the scraper 14, the pressure sensor 82 senses the loading and unloading of the scraper bowl 20 and delivers an activating signal to the timer 80. The manual switch 84 is connected not only to the timer 80 but also to the solenoid of the valve 64. This switch is to be operated by the vehicle operator either for setting the timer 80 into operation or for shifting the solenoid valve 64 to the second offset position 72.

In operation, as the bowl 20 of the scraper 14 becomes loaded or unloaded in the usual operation of the tractor-scraper combination 10, the pressure sensor 82 senses the fact from a change in the hydraulic fluid pressure of the bowl jack 30. The pressure sensor delivers its output signal to the timer 80. Thus activated and turned on, the timer 80 allows energization of the elevation sensor 74 by the power supply 78 for a preassigned length of time. The energized elevation sensor 74 senses the distance between tractor axle 34 and frame 40 and delivers a corresponding signal to the solenoid of the valve 64 of the valve actuating mechanism 58. The solenoid on energization shifts the valve 64 to either of its two offset positions 70 and 72, thereby causing the valve to direct the compressed air from the source 66 toward either of the opposite chambers of the air cylinder 60. With the consequent extension or contraction of the air cylinder 60 the leveling valve 46 is shifted to either of the two offset positions 54 and 56 to communicate the suspension jack 42 with either the pump 50 or the drain.

Thus is the suspension jack 42 extended or contracted to raise or lower the tractor frame 40 with respect to the axle 34. Upon lapse of the preassigned length of time the timer 80 electrically disconnects the elevation sensor 74 from the power supply 78 and so allows the solenoid valve 64 to return to the neutral position 68. The leveling valve 46 also returns to the neutral position 48 to maintain the suspension jack 42 in the state of extension or contraction.

The above operation of the suspension system can also be initiated whenever desired by the vehicle operator, simply as he actuates the manual switch 84. He is also free to turn off the suspension system by the manual switch 84. It will have been appreciated that the output from the pump 50 is directed into the suspension jack 42 only in the event of a change in the load on the scraper 14. At other times the pump is used to power some other hydraulic system of the vehicle, thereby realizing economical use of energy.

Although the illustrated embodiment assumes the use of a suspension jack for each wheel of the tractor in the tractor-scraper combination, the purposes of this invention could of course be accomplished with the use of only one such jack connected between tractor axle 34 and frame 40. The appended claims are intended to cover this and other modifications or changes that will readily occur to the specialists to adapt the fluid suspension system of this invention to vehicles of one type or another.

What is claimed is:

1. An elevationally adjustable fluid suspension system for use in a vehicle, the vehicle having a vehicle frame, an axle connected to the vehicle frame for movement toward and away from the same, and a seperate fluid system the suspension system comprising:
   (a) a source of fluid under pressure;
   (b) a fluid suspension jack adapted to be operatively connected between the axle and the vehicle frame for varying the distance therebetween;
   (c) a directional control valve for normally communicating the pressurized fluid source with said separate fluid system of the vehicle and, on actuation, selectively communicating the fluid suspension jack with the pressurized fluid source and with a fluid drain;
   (d) an externally controllable timer means for producing a signal for a predetermined amount of time;
   (e) means for actuating the timer means connected thereto;
   (f) an elevation sensor means connected to the timer means and adapted to be operatively connected between the axle and the vehicle frame, said elevation sensor means being actuated by the signal from the timer means for putting out a signal representative of the elevation of the vehicle frame from the axle during the predetermined amount of time; and
   (g) valve actuating means operatively connected to the directional control valve responsive to the output signal from the elevation sensor means for operating the directional control valve.

2. The fluid suspension system as recited in claim 1, wherein the means for actuating the timer means comprises a manual switch connected to the timer means for setting the same into operation.

3. The fluid suspension system as recited in claim 1, wherein the valve actuating means comprises:
   (a) a second source of fluid under pressure;
   (b) a fluid actuated cylinder coupled to the directional control valve for operating the same; and
   (c) a second directional control valve connected between and controlling communication between the second pressurized fluid source and the fluid actuated cylinder in response to the output signal from the elevation sensor means.

4. The fluid suspension system as recited in claim 3, wherein the means for actuating the timer means comprises a manual switch connected to the timer means for setting same into operation, and the manual switch is also connected to the second directional control valve for causing the valve actuating means to actuate the first recited directional control valve to place the fluid suspension jack in communication with the fluid drain.

5. The fluid suspension system as recited in claim 1, further comprising an accumulator in constant communication with the fluid suspension jack.

6. A tractor-scraper combination of the type having a single-axle wheel-type tractor and an earthmoving scraper articulately joined together, the tractor having an axle connected to a main frame for movement toward and away from the same and a separate fluid system, the scraper having bowl jack means supporting a bowl, wherein the improvement resides in a fluid suspension system comprising:
   (a) a source of fluid under pressure;
   (b) at least one fluid suspension jack operatively connected between the axle and main frame of the tractor for varying the distance therebetween;
   (c) an accumulator in constant communication with the suspension jack absorbing the dynamic motion of the tractor during travel;
   (d) a leveling valve normally communicating the pressurized fluid source with the separate fluid system and, on actuation, selectively communicating the suspension jack with the pressurized fluid source and with a fluid drain;
   (e) a pressure sensor connected to the bowl jack means of the scraper putting out a signal in the event of a change in the load on the bowl;
   (f) a timer means responsive to the output signal from the pressure sensor for producing a signal for a predetermined amount of time;
   (g) independent means for actuating the timer means connected thereto;
   (h) an elevation sensor means connected between the axle and main frame of the tractor and actuated by the signal from the timer means for putting out a signal representative of the elevation of the main frame from the axle during the predetermined amount of time; and
   (i) valve actuating means operatively connected to the leveling valve and responsive to the output signal from the elevation sensor means for actuating the leveling valve.

7. The tractor-scraper combination as recited in claim 6, wherein the independent means for actuating is a manual switch connected to the timer means for causing the same to actuate the elevation sensor means, and the manual switch also being connected to the valve actuating means for causing same to actuate the leveling valve to place the suspension jack in communication with the fluid drain.

* * * * *